(12) United States Patent
Stall

(10) Patent No.: US 8,572,578 B2
(45) Date of Patent: Oct. 29, 2013

(54) SCRIPT DEBUGGING

(75) Inventor: Jonathon Michael Stall, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 616 days.

(21) Appl. No.: 12/815,854

(22) Filed: Jun. 15, 2010

(65) Prior Publication Data

US 2011/0307872 A1 Dec. 15, 2011

(51) Int. Cl.
*G06F 9/44* (2006.01)

(52) U.S. Cl.
USPC .......................................... 717/129; 717/135

(58) Field of Classification Search
None
See application file for complete search history.

(56) References Cited

U.S. PATENT DOCUMENTS

| | | | |
|---|---|---|---|
| 5,901,315 A | 5/1999 | Edwards | |
| 6,223,202 B1 * | 4/2001 | Bayeh | 718/102 |
| 6,263,489 B1 * | 7/2001 | Olsen et al. | 717/129 |
| 7,107,578 B1 | 9/2006 | Alpern | |
| 7,478,366 B2 | 1/2009 | Bickson | |
| 7,617,084 B1 | 11/2009 | Koslow | |
| 2002/0052926 A1 * | 5/2002 | Bush et al. | 709/217 |
| 2006/0129991 A1 * | 6/2006 | Kilian et al. | 717/124 |
| 2008/0066059 A1 | 3/2008 | Pugh | |
| 2008/0141222 A1 | 6/2008 | Alpern | |
| 2008/0295078 A1 | 11/2008 | Stall | |

OTHER PUBLICATIONS

Mike Stall, "Rules of Funceval", Nov. 2005, MSDN Blogs, retrieved from: http://blogs.msdn.com/b/jmstall/archive/2005/11/15/funceval-rules.aspx.*
Lee et al. "Software Architecture for Mixed-Language Debuggers", Sep. 2008, University of Texas at Austin, Department of Computer Science, Tech report Report # TR-08-39.*
Lee et al. "Debug All Your Code: Portable Mixed-Environment Debugging", Oct. 2009, OOPSLA 2009, pp. 207-225.*
Promislow, Eric, Visual Peri, Feb. 6, 2002, 3 pages.

* cited by examiner

*Primary Examiner* — Chat Do
*Assistant Examiner* — Jue Wang
(74) *Attorney, Agent, or Firm* — Workman Nydegger

(57) ABSTRACT

The present invention extends to methods, systems, and computer program products for script debugging. Embodiments of the invention serve as a plug-in to an existing debugger. The plug-in leverages the debugger's user-interface and engine. The plug-in can be a controller that subscribes to common notifications and is guided by a state machine, which stitches together a script control channel with an existing debug channel.

20 Claims, 3 Drawing Sheets

SCRIPT DEBUGGING

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Some computer programs and applications utilize a plurality of different program languages to implement desired functionality. In some environments, code in a scripting language, such as, for example, Python or Matlab's M, calls out to external functions in another language, such as, for example, C++ (or other native code), C# or Visual Basic. Scripting environments generally provide a debugging experience for corresponding script code. However, scripting environments typically lack any debugging functionality for external code.

As such, developers are relegated to attaching a second different debugger appropriate for the external code. The script debugger and external code debugger then simultaneously attach to the process that is running the script and external code. To some extent, the developers can switch between the script debugger and external code debugger to debug the script and external code as appropriate. However, the script debugger and external code debugger can interfere with one another making debugging more difficult and degrading the user experience.

BRIEF SUMMARY

The present invention extends to methods, systems, and computer program products for script debugging. At a debugger, a read evaluate print loop is used in a normal input state to compile and debug the script. The read-evaluate-print-loop ("REPL") includes one or more read evaluate print iterations. For each iteration user entered text representing user code for the script is received. The user entered text is sent to a listener in a user process. The listener is for dispatching the user entered text to an evaluator thread to execute the user code. Results of executing the user code are received from the evaluator thread.

A breakpoint is encountered in the user code for a specified read-evaluate-print iteration. The breakpoint causes the listener to pause operation. It is determined that the user code can be safely hijacked to continue executing the user code. The debugger transitions to a nested break state.

The read evaluate print loop is simulated in the nested break state to continue to compile and debug the script when the listener is paused. Simulating the read evaluate print loop includes receiving user entered text representing user code for the script. The user entered text is sent to an alternate listener in the user process. The alternate listener is for dispatching the user entered text to the evaluator thread to execute the user code. Results of executing the user code are from the evaluator thread;

It detected that execution of the user code has subsequently continued from the detected breakpoint. The continuation causes the listener to resume operation. Use of the read evaluate print loop is resumed in response to the listener resuming operation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
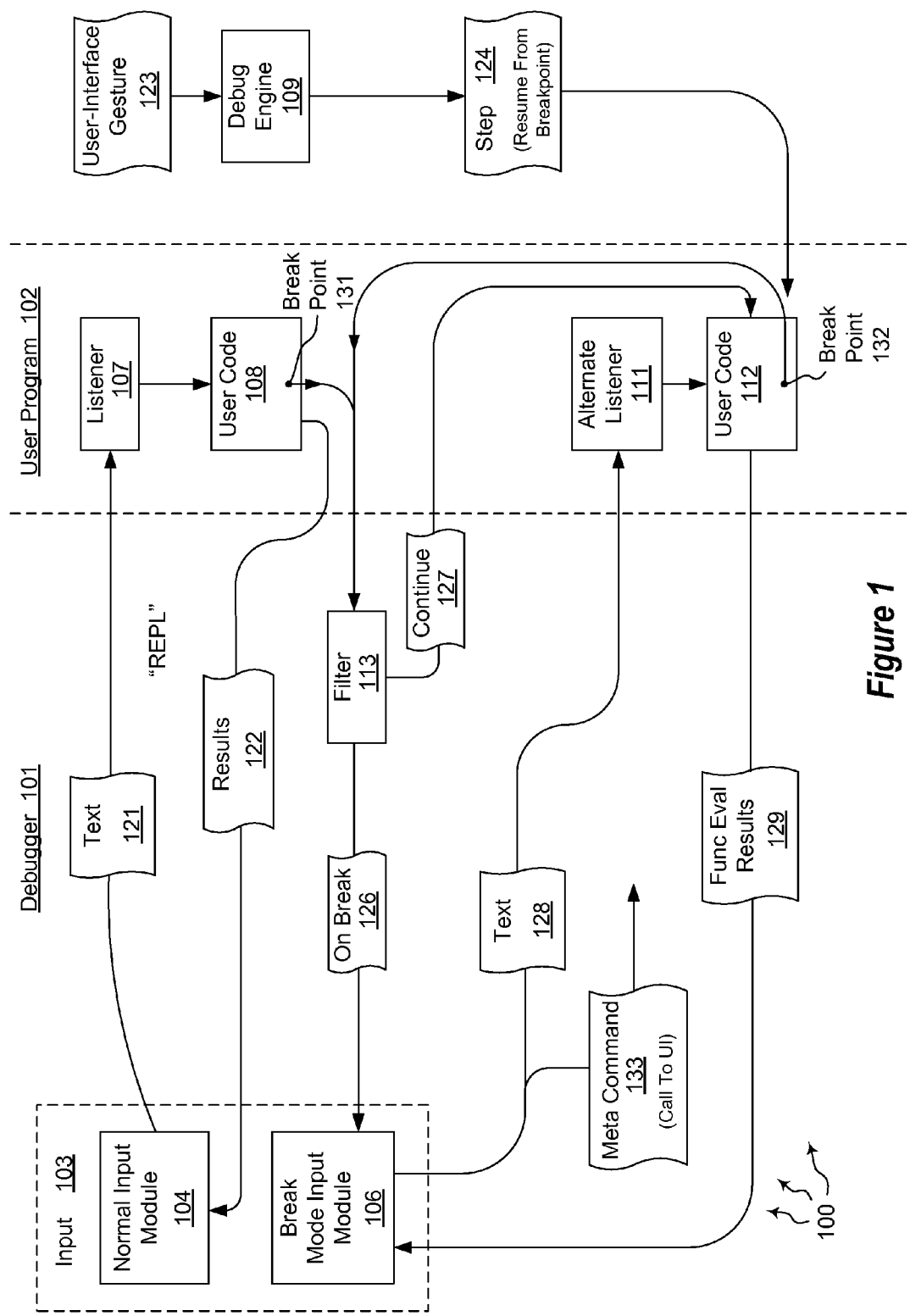
FIG. 1 illustrates an example computer architecture that facilitates script debugging.

The present invention extends to methods, systems, and computer program products for script debugging. At a debugger, a read-evaluate-print-loop ("REPL") is used in a normal input state to compile and debug the script. The read evaluate print loop includes one or more read evaluate print iterations. For each iteration user entered text representing user code for the script is received. The user entered text is sent to a listener in a user process. The listener is for dispatching the user entered text to an evaluator thread to execute the user code. Results of executing the user code are received from the evaluator thread.

A breakpoint is encountered in the user code for a specified read-evaluate-print iteration. The breakpoint causes the listener to pause operation. It is determined that the user code can be safely hijacked to continue executing the user code. The debugger transitions to a nested break state.

The read evaluate print loop is simulated in the nested break state to continue to compile and debug the script when the listener is paused. Simulating the read evaluate print loop includes receiving user entered text representing user code for the script. The user entered text is sent to an alternate listener in the user process. The alternate listener is for dispatching the user entered text to the evaluator thread to execute the user code. Results of executing the user code are from the evaluator thread;

It detected that execution of the user code has subsequently continued from the detected breakpoint. The continuation causes the listener to resume operation. Use of the read evaluate print loop is resumed in response to the listener resuming operation.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, embodiments of the invention serve as a plug-in to an existing debugger (e.g., Visual Studio®). The plug-in leverages the debugger's user-interface and engine. The plug-in can be a controller that subscribes to common notifications and is guided by a state machine, which stitches together a script control channel with an existing debug channel.

FIG. 1 illustrates an example computer architecture 100 that facilitates script debugging. Referring to FIG. 1, computer architecture 100 includes debugger 101, user program 102, and debug engine. Debugger 101 includes filter 113 and input 103, further including normal input module 104 and break mode input module 106. User program 102 includes listener 107, user code 108, alternate listener 111, and user code 112. User code 108 and user code 112 can be different code regions within user program 102. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, debugger 101 has a debug engine capable of debugging script code (e.g., Python or M) and non-script code (e.g., C# or Visual Basic) in a target program.

As depicted, input 103 includes normal input module 104. Script commands (e.g., text) can be entered at normal input module 104. Normal input module 104 can send the script commands to user program 102 (a separate user process). Listener 107 can receive script commands from normal input module 104. The script commands can be executed in the context of user code 108. Results (including notifications of debug events) can be reported from user code 108 back to normal input module 104. Inter-process communication between debugger 101 and user program 102 can be facilitated via any of a variety of different communication channels, including Windows Communication Foundation ("WCF"), pipes, sockets, etc. Data flow between normal input module 104, listener 107, and user code 108 represents a Read Evaluate Print Loop ("REPL") system. Iterations of REPL can continue between input module 104, listener 107, and user code 108 when no debugging events are involved.

Break mode input module 106 plugs into the user interface for debugger 101. Accordingly, break mode input module 106 can leverage debug engine 109 and stitch together a combine script code/non-script code debugging experience. Break mode input module 106 can operate in accordance with a state machine based on a variety of triggers. Break mode input module 106 can register to receive these triggers from debugger 101. Triggers can include: notification of debug events (e.g., hitting a breakpoint) in the target, notification from debugger 101 that user program 102 is about to resume execution, communication channel (e.g., WCF) notifications signaling that user program 102 is complete, and indications of script code (text) entered by the user and requested to execute.

Break mode input module 106 can also send script code (text) to user program 102 to execute and inject code into user program 102 to execute a helper function. When user program 102 is blocked at a breakpoint, break mode input module 106 can hijack the process for user program 102 from the breakpoint. Hijacking can be performed by calling out to another function (e.g., using a func-eval technique) when user program 102 is blocked at a break point. Break mode input module 106 can utilize the call out to simulate REPL when user program 102 is blocking at a breakpoint In general, user program 102 is running when script code is executed via REPL. However, under some conditions user program 102 may be in a state where an event cannot be sent, for example, the hijack mechanism does not work (e.g., when user program 102 is stopped in native code). Alternately, conditions can exist wherein, even if hijacking user program 102 were successful, user program 102 would not be able to safely execute the code. As such, script can be run when user program 102 is in valid states. However, debug events can occur during any of variety of different states, many of which are invalid states for code execution. If a debug event occurs outside of a valid state it can be ignored.

Filter 113 is configured to detect debug events. If a debug event is in an invalid state it can be continued (e.g., by issuing continue 127). Invalid states can be referred to as "can't stop regions", since debugger 101 cannot stop for script debugging in that region. On the other hand, if a debug event is in a valid state, notification of the debug event can proceed to break mode input module 106.

Filter 113 can use any of a variety of mechanisms to distinguish between valid and invalid states. In some embodiments, all regions are assumed to be can't stop regions unless specifically marked as safe. In other embodiments, debugger 101 uses inspection routines to determine the state of user program 102. For example, debugger 101 can determine the state of user program 102 from a process call stack.

Embodiments of the invention can be integrated with existing debugger user interface commands. Debugging operations, such as, for example, step and run, can be performed by a debugger user interface gesture (e.g., pressing F10 to step). Debug engine 100 can receive gestures, such as, for example, user interface gesture 123, and implement the appropriate debug operation, such as, for example, step 124. Alternately, a command for a debug operation can be entered form REPL. For example, meta command 113 (e.g., "step") can be entered. Meta command 133 can call the user interface for debugger 101 to invoke the same functionality that generated step 124.

Figure 2:
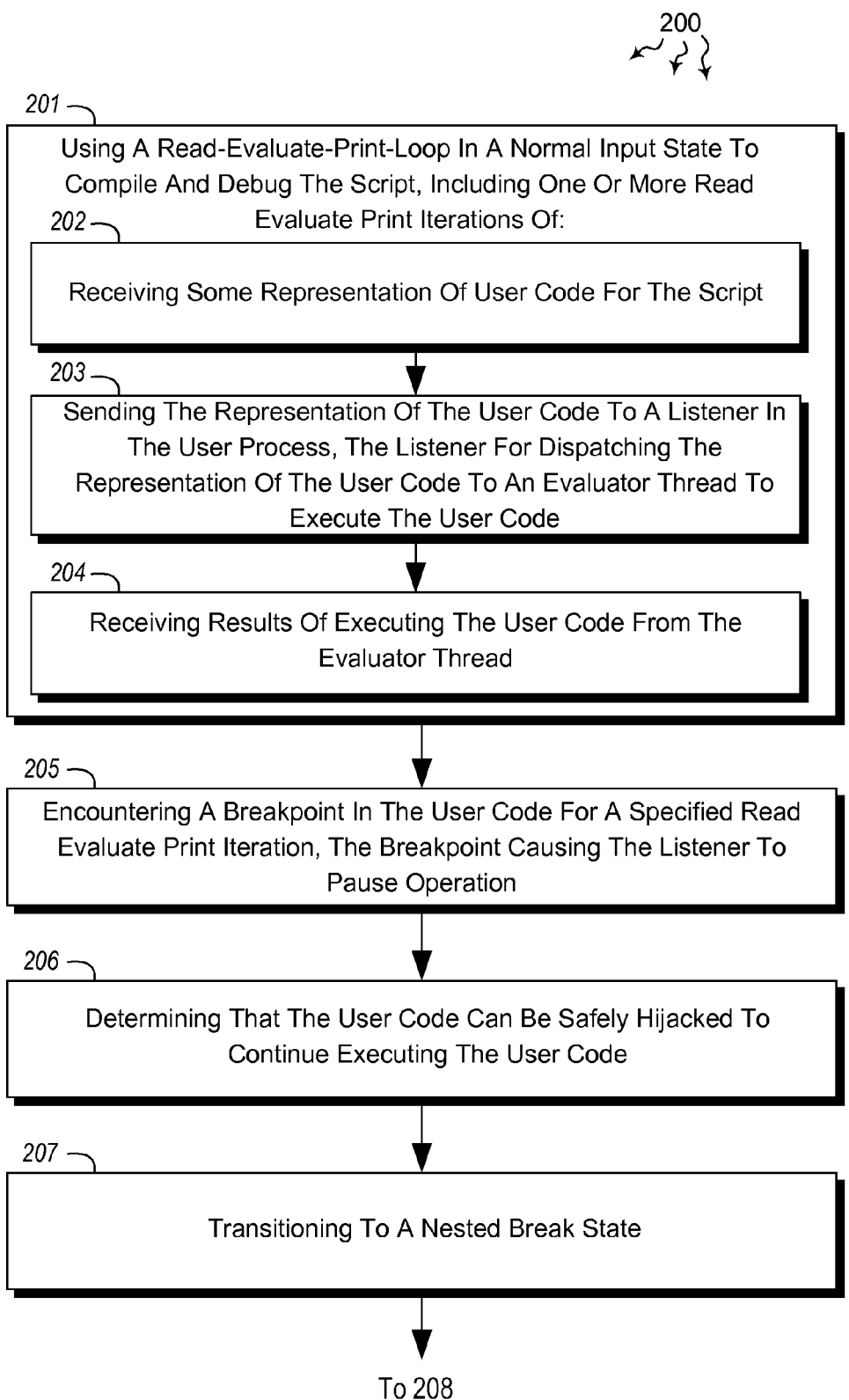
FIG. 2 illustrates a flow chart of an example method for script debugging.
Figure 2:
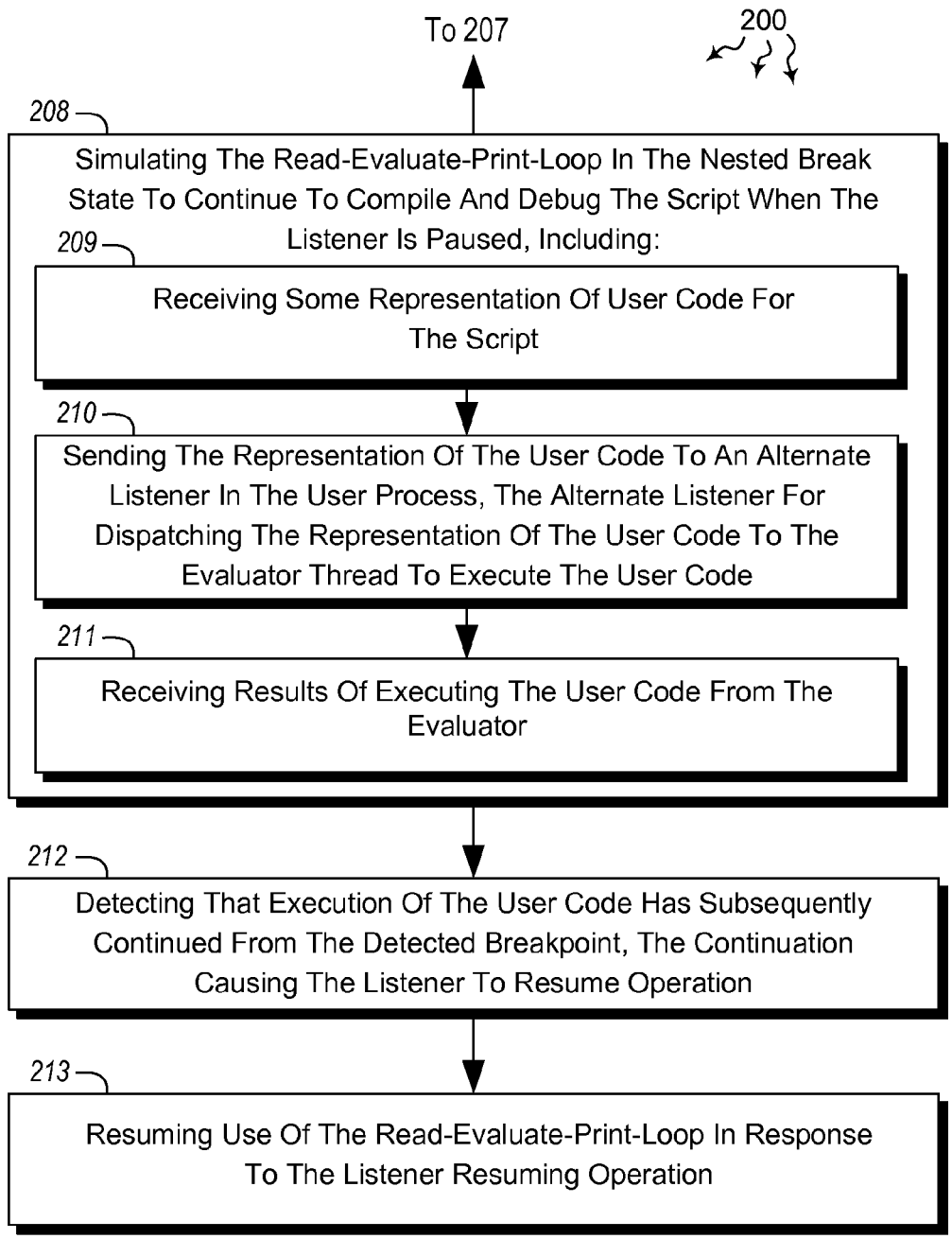

FIG. 2 illustrates a flow chart of an example method 200 for script debugging. Method 200 will be described with respect to the components and data of computer architecture 100.

Method 200 includes an act of using a read-evaluate-print-loop in a normal input state to compile and debug the script (act 201). For example, normal input module 104, listener 107, and user code 108 can interoperate providing REPL functionality. Act 201 includes one or more read evaluate print iterations of: an act of receiving some representation of user code for the script (act 202), an act of sending the representation of the user code to a listener in the user process (act 203), and an act of receiving results of executing the user code from the evaluator thread (act 204). For example, a user can enter text 121 (e.g., a portion of script code) at normal input module 104. Normal input module 104 can send text 121 to user program 102 and listener 107 can receive text 121. Listener 107 can dispatch text 121 to user code 108. Text 121 can be executed in the context of user code 108. Execution of text 121 can generate results 122 (e.g., "On complete", "break", etc.). Results 122 can be sent to debugger 101. Normal input module 104 can receive results 122. Similar REPL iterations based on other entered text can occur.

Alternately, a non-textual representation of user code can be sent to listener 107. The non-textual representation can be the results of doing a parse in a debugger application. For example, text 121 can be parsed, the parsed text used to generate a tree data structure or byte code, and then the tree data structure or byte code sent to listener 107. Listener 107 can dispatch the tree data structure or byte code to user code 108. The tree data structure or byte code can be processed in the context of user code 108. Similar REPL iterations parsing other entered text can occur.

Method 200 includes an act of encountering a breakpoint in the user code for a specified read evaluate print iteration, the breakpoint causing the listener to pause operation (act 205). For example, debugger 101 can encounter breakpoint 131 in user code 108. Breakpoint 131 causes listener 107 to pause operation.

Method 200 includes an act of determining that the user code can be safely hijacked to continue executing the user code (act 206). For example, filter 113 can determine that user code 112 can be safely hijacked to continue executing user code 108/112. Filter 113 can send On Break 126 to break model input module 106 to indicate that user program 102 can be safely hijacked. Method 200 includes an act of transitioning to a nested break state (act 207). For example, debugger 101 can transition to a nested break state. In the nested break state, user entered text is received at break mode input module 106.

Method 200 includes an act of simulating the read-evaluate-print-loop in the nested break state to continue to compile and debug the script when the listener is paused (act 208). For example, break mode input module, alternate listener 111, can user code 112 can interoperate to simulate REPL when listener 107 is paused.

Act 208 includes an act of receiving some representation of user code for the script (act 209). For example, break mode input module 106 can receive text 128. Break mode input module 106 can also receive meta command 133 when appropriate. Act 208 includes an act of sending the representation of the user code to an alternate listener in the user process, the alternate listener for dispatching the representation of the user code to the evaluator thread to execute the user code (act 210). For example, break mode input module 106 can send text 128 to user program 102. Alternate listener 111 can receive text 128. Alternate listener 111 can dispatch text 128 to user code 111. Text 129 can be executed in the context of user code 111.

Alternately, a non-textual representation of user code can be sent to alternate listener 111. The non-textual representation can be the results of doing a parse in a debugger application. For example, text 128 can be parsed, the parsed text used to generate a tree data structure or byte code, and then the tree data structure or byte code sent to alternate listener 111. Alternate listener 111 can dispatch the tree data structure or byte code to user code 112. The tree data structure or byte code can be processed in the context of user code 112. Similar REPL iterations parsing other entered text can occur.

Act 208 includes an act of receiving results of executing the user code from the evaluator thread (act 211). For example, execution of text 128 can generate func-eval results 129 (e.g., "On complete", "break", etc.). Func-eval results 129 can be sent to debugger 101. Break mode input module 106 can receive results func-eval results 129. Similar simulated REPL iterations based on other entered text can occur.

If a further break point, such as, for example, break point 132, is encountered, filter 113 can determine if additional hijacking is possible. If additional hijacking is possible, similar mechanisms can again be used to simulate REPL.

Method 200 includes an act of detecting that execution of the user code has subsequently continued from the detected breakpoint, the continuation causing the listener to resume operation (act 212). For example, debugger 101 can detect that user program 120 has continued from break point 131. Continuation of user program 108 causes listener 107 to result operation. Method 200 includes an act of resuming use of the read evaluate print loop in response to the listener resuming operation (act 213). For example, normal input module 104, listener 107, and user code 108 can again interoperate providing REPL functionality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for debugging a script that includes a call to non-script code, the method comprising:
    an act of executing a debugger process and a user process at a computer system including one or more processors and system memory, the debugger process including a normal input module, a break mode input module, and debugger engine capable of debugging both script and non-script code, the user process including a listener, an alternative listener, a first code portion, and a second code portion, wherein the normal input module, the listener, and the first code portion are configured to interoperate to provide a read-evaluate-print-loop in a normal input state, and the break mode input module, the alternative listener, and the second code portion are configured to interoperate to provide a simulated read-evaluate-print-loop in a nested break state;
    an act of using the read-evaluate-print-loop in the normal input state to compile and debug the script, including one or more read-evaluate-print iterations of:
        an act of the normal input module of the debugger process receiving some representation of user code for the script;
        an act of the normal input module sending the representation of the user code to the listener in the user process, the listener being configured to dispatch the representation of the user code to an evaluator thread to execute the user code; and
        an act of the normal input module receiving results of executing the user code from the evaluator thread;
    an act of encountering a breakpoint in the user code for a specified read-evaluate-print iteration, the breakpoint causing the listener to pause operation;
    an act of determining that the user code can be safely hijacked from the breakpoint to continue executing the user code;
    if the user code is safely hijacked:
        an act of transitioning to the nested break state;
        an act of simulating the read-evaluate-print-loop in the nested break state to continue to compile and debug the script when the listener is paused, including:
            an act of the break mode input module of the debugger process receiving some representation of user code for the script;
            an act of the break mode input module sending the representation of the user code to the alternate listener in the user process, the alternate listener for dispatching the representation of the user code to the evaluator thread to execute the user code; and
            an act of the break mode input module receiving results of executing the user code from the evaluator thread;
    an act of detecting that execution of the user code has subsequently continued from the encountered breakpoint, the continuation causing the listener to resume operation; and
    an act of resuming use of the read-evaluate-print-loop in response to the listener resuming operation.

2. The method as recited in claim 1, wherein the act of receiving some representation of user code for the script comprises an act of receiving text representing user code in a script code language.

3. The method as recited in claim 1, wherein the act of receiving results of executing the user code from the evaluator thread comprises an act of receiving a debugger state.

4. The method as recited in claim 1, wherein the act of determining that the user code can be safely hijacked from the breakpoint to continue executing the user code comprises an act of detecting that a code region in the user program is expressly marked as safe for hijacking.

5. The method as recited in claim 1, wherein the act of determining that the user code can be safely hijacked from the breakpoint to continue executing the user code comprises an act of a filter using inspection routines on the user program to determine that a code region in the user program is safe for hijacking.

6. The method as recited in claim 1, wherein the act of transitioning to the nested break state comprises an act of transitioning to the nested break state in response to determining that the user code can be safely hijacked.

7. The method as recited in claim 1, wherein the act of detecting that execution of the user code has subsequently continued from the encountered breakpoint comprises an act of receiving a user entered step command.

8. The method as recited in claim 7, wherein the act of receiving a user entered step command comprises an act of receiving a step command entered from one of: a user interface of the debugger and a meta command received at the break mode input module.

9. A computer program product for use at a computer system, the computer program product for implementing a method for debugging a script that includes a call to non-script code, the computer program product comprising one or more non-volatile computer storage devices having stored thereon computer-executable instructions that, when executed at a processor, cause the computer system to perform the method, including the following:

execute a debugger process and a user process, the debugger process including a normal input module, a break mode input module, and a debugger engine capable of debugging both script and non-script code, the user process including a listener, an alternative listener, a first code portion, and a second code portion, wherein the normal input module, the listener, and the first code portion are configured to interoperate to provide a read-evaluate-print-loop in a normal input state, and the break mode input module, the alternative listener, and the second code portion are configured to interoperate to provide a simulated read-evaluate-print-loop in a nested break state;

use the read-evaluate-print-loop in the normal input state to compile and debug the script, including one or more read-evaluate-print iterations of:
the normal input module of the debugger process receiving some representation of user code for the script;
the normal input module sending the representation of the user code to the listener in the user process, the listener for dispatching the representation of the user code to an evaluator thread to execute the user code; and
the normal input module receiving results of executing the user code from the evaluator thread;

encounter a breakpoint in the user code for a specified read-evaluate-print iteration, the breakpoint causing the listener to pause operation;

determine that the user code can be safely hijacked from the breakpoint to continue executing the user code;

if the user code is safely hijacked:
transition to the nested break state;
simulate the read-evaluate-print-loop in the nested break state to continue to compile and debug the script when the listener is paused, including:
the break mode input module of the debugger process receiving some representation of user code for the script;
the break mode input module sending the representation of the user code to the alternate listener in the user process, the alternate listener for dispatching the representation of the user code to the evaluator thread to execute the user code; and
the break mode input module receiving results of executing the user code from the evaluator thread;
detect that execution of the user code has subsequently continued from the encountered breakpoint, the continuation causing the listener to resume operation; and
resume use of the read-evaluate-print-loop in response to the listener resuming operation.

10. The computer program product as recited in claim 9, wherein computer-executable instructions that, when executed, cause the computer system to receive results of executing the user code from the evaluator thread comprise computer-executable instructions that, when executed, cause the computer system to receive a debugger state.

11. The computer program product as recited in claim 9, wherein computer-executable instructions that, when executed, cause the computer system to determine that the user code can be safely hijacked from the breakpoint to continue executing the user code comprise computer-executable instructions that, when executed, cause the computer system to detect that a code region in the user program is expressly marked as safe for hijacking.

12. The computer program product as recited in claim 9, wherein computer-executable instructions that, when executed, cause the computer system to determine that the user code can be safely hijacked from the breakpoint to continue executing the user code comprise computer-executable instructions that, when executed, cause the computer system to use inspection routines on the user program to determine that a code region in the user program is safe for hijacking.

13. The computer program product as recited in claim 9, wherein computer-executable instructions that, when executed, cause the computer system to transition to the nested break state comprise computer-executable instructions that, when executed, cause the computer system to an transition to the nested break state in response to determining that the user code can be safely hijacked.

14. The computer program product as recited in claim 9, wherein computer-executable instructions that, when executed, cause the computer system to detect that execution of the user code has subsequently continued from the encountered breakpoint comprise computer-executable instructions that, when executed, cause the computer system to receive a user entered step command.

15. The computer program product as recited in claim 14, wherein computer-executable instructions that, when executed, cause the computer system to receive a user entered step command comprise computer-executable instructions that, when executed, cause the computer system to receive a step command entered from one of: a user interface of the debugger and a meta command received at the break mode input module.

16. A system for debugging script code that includes calls to external non-script code, the system comprising:
one or more processors;
system memory; and
one or more computer storage media having stored thereon computer-executable instructions representing a debugger and a user program, the debugger including a debugger engine capable of debugging both script and non-script code, a normal input module, a filter, and a break mode input module, the user program including a listener, an alternative listener, a first code portion, and a second code portion, wherein:
the normal input module, the listener, and a first code portion of the user program are configured to interoperate to provide read-evaluate-print-loop functionality when the debugger is in the normal input state, including:
the normal input module being configured to receive user entered text representing user code for a script;
the normal input module being configured to send the user entered text to the listener in the user process, the listener for dispatching the user entered text to an evaluator thread to execute the user code; and
the normal input module being configured to receive results of executing the user code from the evaluator thread;
in response to detecting a breakpoint in the first code portion of the user program, the filter is configured to determine whether the second code portion of the user program can be safely hijacked from the detected breakpoint; and
the break mode input module, the alternate listener, and the second code portion of the user program are configured to interoperate to simulate read-evaluate-print-loop functionality when the debugger is in the nested break state and the second code portion is safely hijacked, including:
the break mode input module being configured to receive user entered text representing user code for the script;

the break mode input module being configured to send the user entered text to the alternate listener in the user process, the alternate listener for dispatching the user entered text to the evaluator thread to execute the user code; and the break mode input module being configured to receive results of executing the user code from the evaluator thread; and the listener is configured to pause operation when a breakpoint in the first code portion is encountered, and to resume operation when it is detected that execution has continued from the breakpoint.

17. The system as recited in claim 16, wherein determining that the second code portion can be safely hijacked from the detected breakpoint comprises detecting that a code region in the second code portion is expressly marked as safe for hijacking.

18. The system as recited in claim 16, wherein determining that the second code portion can be safely hijacked from the detected breakpoint comprises the filter using inspection routines on the second code portion to determine that a code region in the second code portion is safe for hijacking.

19. The system as recited in claim 16, wherein detecting that execution has continued from the breakpoint comprises receiving a user entered step command.

20. The system as recited in claim 19, wherein receiving a user entered step command comprises receiving a step command entered from one of: a user interface of the debugger or a meta command received at the break mode input module.

* * * * *